United States Patent
Tamada et al.

(10) Patent No.: US 8,792,109 B2
(45) Date of Patent: Jul. 29, 2014

(54) PRINTING CONTROL APPARATUS, IMAGE FORMING APPARATUS AND PRINTING SYSTEM

(75) Inventors: Takeshi Tamada, Toyohashi (JP); Akinori Kimata, Toyokawa (JP); Kenji Yamamoto, Hachioji (JP); Akihiro Hayashi, Okazaki (JP); Yoshihito Sasamoto, Hachioji (JP); Kenji Tamaki, Tokorozawa (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 182 days.

(21) Appl. No.: 13/432,779

(22) Filed: Mar. 28, 2012

(65) Prior Publication Data
US 2012/0250058 A1    Oct. 4, 2012

(30) Foreign Application Priority Data
Mar. 31, 2011    (JP) .................... 2011-077281

(51) Int. Cl.
*G06F 3/12* (2006.01)
*G06K 15/00* (2006.01)
*H04N 1/00* (2006.01)
*G06F 1/26* (2006.01)

(52) U.S. Cl.
USPC ........ 358/1.13; 358/1.15; 358/1.16; 358/403; 713/310; 713/300

(58) Field of Classification Search
None
See application file for complete search history.

(56) References Cited

U.S. PATENT DOCUMENTS

| | | | |
|---|---|---|---|
| 8,001,398 B2 * | 8/2011 | Tamasaki | 713/310 |
| 2008/0028241 A1 * | 1/2008 | Tamasaki | 713/310 |
| 2009/0129808 A1 * | 5/2009 | Kamei | 399/88 |
| 2009/0296163 A1 * | 12/2009 | Koura | 358/403 |
| 2011/0116128 A1 * | 5/2011 | Tamada | 358/1.15 |
| 2011/0243594 A1 * | 10/2011 | Saito | 399/70 |

FOREIGN PATENT DOCUMENTS

JP    2010-9058    1/2010

* cited by examiner

*Primary Examiner* — Satwant Singh
(74) *Attorney, Agent, or Firm* — Buchanan Ingersoll & Rooney PC (57) ABSTRACT

A printing control apparatus connected via a network with one or more of image forming apparatuses includes: a power source detection section which detects an image forming apparatus turned on; and a setting section which sets a mode shift time for shifting from a normal power mode to a power saving power mode a power consumption of which is less than a power consumption of the normal power mode of each of the image forming apparatuses; and a notice section which notices the set mode shift time to the image forming apparatus corresponding to the mode shift time, wherein the setting section changes the mode shift time when a plurality of image forming apparatuses which has been turned on is connected with the network, by comparing with a case when the network is connected with only one image forming apparatus turned on.

13 Claims, 7 Drawing Sheets

| A1 | A2 | A3 | A1 | A2 | A3 |
|---|---|---|---|---|---|
| AUTOMATIC RESET | AUTOMATIC RESET | AUTOMATIC RESET | 30min | 30min→10min | 30min→10min |
| AUTOMATIC RESET | AUTOMATIC RESET | AUTOMATIC RESET | 120min | 120min→10min | 120min→10min |
| AUTOMATIC RESET | AUTOMATIC RESET | AUTOMATIC RESET | 30min | 120min→10min | 120min→10min |
| AUTOMATIC RESET | AUTOMATIC RESET | AUTOMATIC RESET | 30min | 30min→10min | 120min→10min |

FIG. 10

|  | A1 | A2 | A3 |
|---|---|---|---|
| (PRIORITY 1) RESET PROCEDURE | AUTOMATIC RESET | AUTOMATIC RESET | AUTOMATIC RESET |
| (PRIORITY 2) STANDBY POWER DIFFERENCE | 0.6W(1.5-0.9) | 3W(5-2) | 1.5W(3-1.5) |
| (PRIORITY 3) ELAPSED TIME | 3min | 100min | 3min |
| MODE SHIFT TIME | 30min | 30min→10min | 30min→10min |

FIG. 11

|  | A1 | A2 | A3 |
|---|---|---|---|
| (PRIORITY 1) RESET PROCEDURE | AUTOMATIC RESET | AUTOMATIC RESET | AUTOMATIC RESET |
| (PRIORITY 2) STANDBY POWER DIFFERENCE | 2W(5-3) | 2W(5-3) | 2W(5-3) |
| (PRIORITY 3) ELAPSED TIME | 6min | 100min | 3min |
| MODE SHIFT TIME | 30min→10min | 30min | 30min→10min |

FIG. 12

PRINTING CONTROL APPARATUS, IMAGE FORMING APPARATUS AND PRINTING SYSTEM

This application is based on Japanese Patent Application No. 2011-077281 filed on Mar. 31, 2011, in Japanese Patent Office, the entire content of which is hereby incorporated by reference.

FIELD OF THE INVENTION

The present invention relates to a printing control apparatus, image forming apparatus and printing system.

BACKGROUND

One of the apparatuses known in the conventional art is an image forming apparatus wherein a plurality of power modes can be switched, as required, for the purpose of power saving. For example, the Unexamined Japanese Patent Application Publication No. 2010-9058 discloses an image forming apparatus wherein the power mode can be switched. This image forming apparatus has a normal power mode wherein an image forming process can be started upon receipt of a request for image forming, and a power saving mode wherein power consumption is smaller than that in the normal power mode. For example, when the time elapsed after termination of the image forming operation has reached the mode shift time, the power mode shifts from the normal power mode to the power saving mode. The mode shift time is predetermined and is preset on the image forming apparatus.

Incidentally, the recent development of the network environment has produced a printing system wherein a plurality of image forming apparatuses can be shared by connecting a plurality of image forming apparatuses via the network. However, in the conventional method, the mode shift time is preset as in the case of using each of the image forming apparatuses independently even in such an environment. Accordingly, a sufficient power saving environment may not be provided in terms of the overall power management for each apparatus.

In view of the problem described above, it is an object of the present invention to enable power saving to be achieved in terms of overall power consumption for each image forming apparatus in an environment wherein a plurality of image forming apparatuses connected via the network can be employed.

SUMMARY OF THE INVENTION

To achieve at least one of the above mentioned objects, a printing control apparatus reflecting one aspect of the present invention which is connected communicatably via a network with a plurality of image forming apparatuses, comprises: a power source detection section which detects an image forming apparatus which has been turned on, out of the plurality of image forming apparatuses connected with the network; and a setting section which, based on a result of the detection by the power source detection section, sets a mode shift time for shifting a power consumption mode for each of image forming apparatuses which have been turned on, from a normal power mode to a power saving mode a power consumption of which is less than a power consumption of the normal power mode, when the mode shift time has passed after a completion of a last image formation job of the each of image forming apparatuses; and a notice section which notices the set mode shift time to the image forming apparatus corresponding to the mode shift time, wherein the setting section changes the mode shift time in a case when a plurality of image forming apparatuses that has been turned on is connected with the network, by comparing with in a case when only one image forming apparatus which has been turned on is connected with the network.

DETAILED DESCRIPTION OF THE PREFERRED EMBODIMENTS

Figure 1:
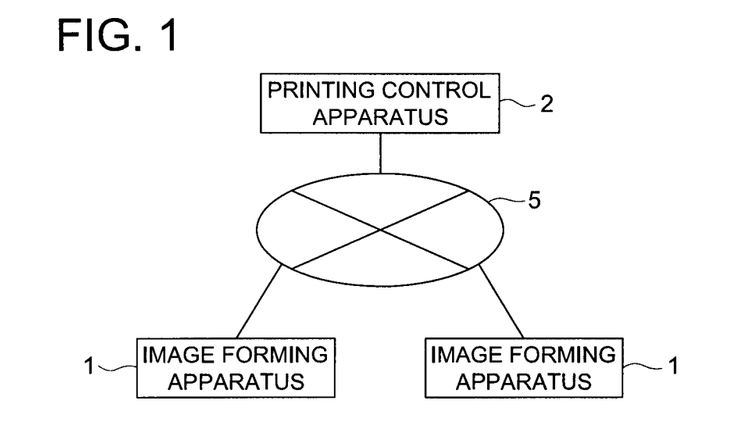
FIG. 1 is a block diagram showing the overall structure of a printing system.

FIG. 1 is a block diagram showing the overall structure of a printing system in the present embodiment. The printing system of the present embodiment includes a plurality of image forming apparatuses 1 and a printing control apparatus 2. These devices are connected communicatably via the network 5 such as LAN or WAN. Further, this network 5 can be connected with an information processing device (not illustrated) such as a PC. This information processing device is capable of outputting a printing job to the image forming apparatus 1 via the network 5. The network used for connection between the image forming apparatus 1 and printing control apparatus 2 is not restricted to LAN or WAN. Direct connection (local connection) can be utilized, so long as the printing control apparatus 2 can be connected communicatably with each of the image forming apparatuses 1.

Figure 2:
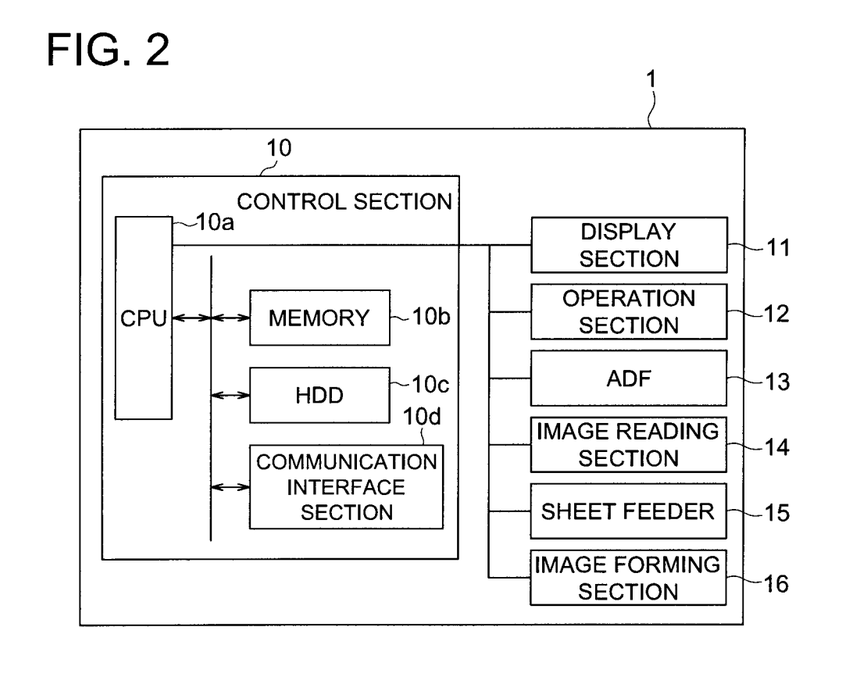
FIG. 2 is a block diagram showing the structure of an image forming apparatus 1.

FIG. 2 is a block diagram showing the structure of an image forming apparatus 1. The image forming apparatus 1 is designed to form an image on a sheet of paper. For example, the image forming apparatus 1 is a multi-functional printer (MFP) having a plurality of function such as copying, printing, scanning and networking. The major components of this image forming apparatus 1 include a control section 10, display section 11, operation section 12, ADF 13, image reading section 14, sheet feeder 15 and image forming section 16.

The control section 10 includes a CPU 10a, memory 10b such as a ROM or RAM, HDD (Hard Disk Drive) 10c as an auxiliary storage device, and communication interface section 10d. These components are connected with one another via a bus. The CPU 10a controls various components in conformity to a control program. The memory 10b is an area for temporarily storing the various forms of data read from the HDD 10c and communication interface section 10d. The stored data is processed by the CPU 10a and is sent to the HDD 10c or communication interface section 10d whenever required. The HDD 10c stores the control program and information on device processing functions. Such data is read out by the CPU 10a wherever required, and is processed in the memory 10b. The communication interface section 10d is connected with other devices via the network 5 to exchange data.

The display section 11 includes an LCD (Liquid Crystal Display) and organic EL (electroluminescence) display device, and is controlled by the control section 10 to display various forms of screens. The operation section 12 contains buttons and switches. When operated by the user, various forms of settings, printing conditions (the number of copies, sheet size and magnification) and print startup instructions are inputted to the control section 10. The display section 11 and operation section 12 can be structured independently of each other. However, it is also possible to adopt such an integrated structure that a pressure sensitive operation section 13 (touch panel) with transparent electrodes arranged in a grid pattern is provided on the display section 11, for example.

The ADF 13 is an automatic document feed apparatus for feeding one or more documents automatically to the image reading section 14.

The image reading section 14 includes an image pickup element such as a CCD for converting the light reflected by the light source and document into electric signals, and an analog-to-digital converter for analog-to-digital conversion of an electric signal. This image reading section 14 optically reads out the image of the document fed by the ADF 13, and obtains an image signal. To put it more specifically, the image reading section 14 ensures the document image to be irradiated with the light source, and allows the reflected light thereof to be formed on the light receiving surface of the image pickup element. The inputted light is subjected by photoelectric conversion by the image pickup element so that a prescribed image signal is outputted. This signal is subjected to analog-to-digital conversion and is outputted to the control section 10 as image data.

The sheet feeder 15 includes a sheet tray for storing paper of various sizes and a means of conveyance such as a roller and guide member. The sheet feeder 15 feeds the user-specified sheet to the image forming section 16.

The image forming section 16 forms an image on the sheet. The image forming section 16 of the present embodiment uses an electrophotographic process to form an image, and includes an exposure unit made up of a laser light source and optical system; a charging and development unit composed of a photoreceptor drum and charging and development sections arranged on the periphery of the photoreceptor drum and transfer unit such as a roller; and a fixing unit, for example. In the image forming section 16, an image (toner image) is formed on the sheet in conformity to the image data through a series of steps of (1) charging the photoreceptor drum, (2) forming an electrostatic latent image on the photoreceptor drum by means of the exposure section, (3) depositing toner on the electrostatic latent image having been formed, (4) transferring the toner image onto the photoreceptor drum, and (5) fixing the transferred toner image onto the sheet.

In the image forming apparatus 1 having the above-mentioned structure, the control section 10 controls the display section 11, operation section 12, ADF 13, image reading section 14, sheet feeder 15 and image forming section 26 so that an image is formed on the sheet. To put it more specifically, the control section 10 allows an image to be formed on the sheet based on the printing job received from the PC connected to the network or another image forming apparatus 1, or based on the printing job including the image data outputted from the image reading section 14 and the printing conditions inputted by the user through the operation section 12.

In relation to the present embodiment, the control section 10 has a normal power mode and a power saving mode that can be mutually switched. Basically, the normal power mode is set by the control section 10. However, when prescribed requirements have been met, the power mode is switched from the normal power mode to the power saving mode.

The normal power mode is the mode wherein the power required for image formation is supplied to the image forming apparatus 1. This mode is initially set when the power of the image forming apparatus 1 has been turned on. To put it more specifically, power is supplied to the control section 10 when the internal main relay (power relay (not illustrated)) has been turned on synchronously with (operation switch (not illustrated)) the operation of the external switch that can be operated by the user. When the control section 10 has been started by the received power, the control section 10 turns on a prescribed internal relay so that power is supplied to various elements required to form an image.

In the power saving mode, power consumption is smaller than that in the normal power mode. The power saving mode is available in two different types according to the method of resetting to the normal power mode. One is a self-resetting type power saving mode (hereinafter referred to as "automatic reset mode"), and the other is a manual reset type power saving mode (hereinafter referred to as "manual reset mode"). One of these two types of power saving modes is preset on the image forming apparatus 1.

In the automatic reset mode, the power saving mode is automatically reset to the normal power mode, without depending on the manual operation wherein the user turns on the operation switch again. The automatic reset mode is used, for example, when the internal relay is turned off from the control section 10 and power is supplied only on the control section 10. In the automatic reset mode, power is supplied to the control section 10. Accordingly, the mode is reset to the normal power mode when the control section 10 has turned on a prescribed internal relay as a result of inputting the printing job.

In the manual reset mode, on the other hand, the power saving mode cannot be reset to the normal power mode automatically. When reset to the normal power mode, this manual reset mode requires manual operation to be made by the user in such a way that the operation switch is turned on again by the user. The manual reset mode is used, for example, when the power relay is turned off by the control section 10, and the power of the image forming apparatus 1 is turned off. In this state, power is not supplied to the control section 10 and the entire image forming apparatus 1 including other elements. The normal power mode can be reset only by turning on the image forming apparatus 1, namely, only by the operation switch being operated by the user. It should be noted that the manual reset mode could be so designed that a prescribed amount of power, for example, several percent of the rated power is kept supplied, without being restricted to complete suspension of power supply to the image forming apparatus 1.

As described above, the control section 10 initially selects the normal power mode as a power mode. This mode is shifted to the power saving mode on condition that the time elapsed after termination of the final printing job reaches the mode shift time. This mode shift time is the requirement for the control section 10 to determine that the control section 10 should change the power mode from the normal power mode to the power saving mode. As will be described later, when the mode shift time has been sent from the printing control apparatus 2 as a command, the control section 10 sets the mode shift time as the self-set information.

The power status of the image forming apparatus 1, namely, the on-off status of the power relay is sent by the control section 10 to the printing control apparatus 2 as the command. Then the type of the power saving mode preset therein, namely, information on the manual reset mode or automatic reset mode is sent by the control section 10 to the printing control apparatus 2 as a command. Further, the time elapsed after the final printing job can be sent by the control section 10 to the printing control apparatus 2 as a command, whenever required.

Figure 3:
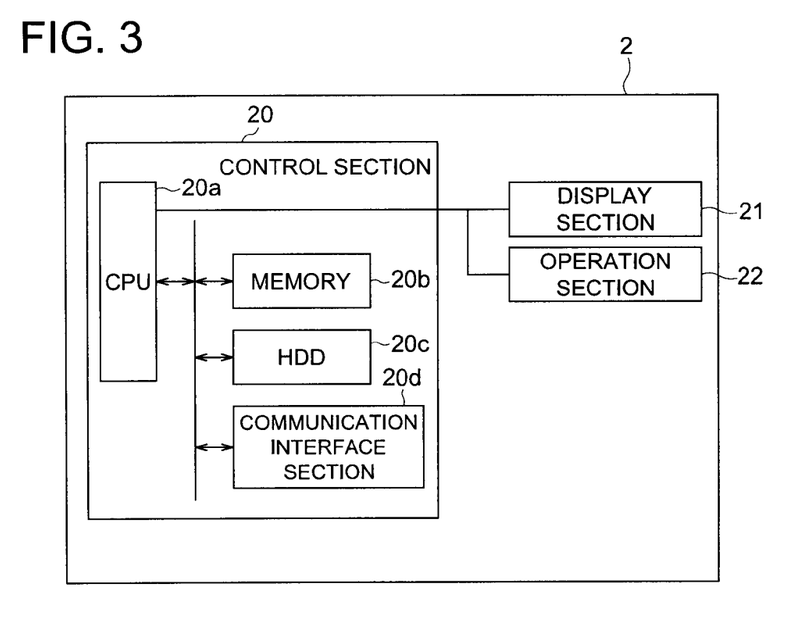
FIG. 3 is a block diagram showing the structure of a printing control apparatus 2.

FIG. 3 is a block diagram showing the structure of a printing control apparatus 2. The printing control apparatus 2 manages the image forming apparatus 1 connected via the network 5. The major components of the printing control apparatus 2 include a control section 20, display section 21 and operation section 22.

The control section 20 is provided with a CPU 20*a*, memory 20*b* such as ROM or RAM, HDD (Hard Disk Drive) 20*c* as an auxiliary storage device, and communication interface section 20*d*. These components are interconnected through a bus. The components constituting the control section 20 have the same function as the aforementioned elements constituting the control section 10.

In relation to the present embodiment, the control section 20 detects the image forming apparatus 1 that has been turned on, out of the a plurality of image forming apparatuses 1 connected via the network 5 (power source detection section). This function is performed when the control section 20 receives the command from each of the image forming apparatuses 1 connected to the network 5. Further, based on the result of detection, the control section 20 sets the mode shift time for each of the image forming apparatuses 1 that has been turned on (setting section). The control section 20 sends the preset mode shift time to the image forming apparatus 1 as the command, thereby notifying the relevant image forming apparatus 1 of the mode shift time (notice section).

The display section 21 includes an LCD (Liquid Crystal Display) and organic EL (electroluminescence) display device, and is controlled by the control section 20 to display various forms of screens. Further, the operation section 22 includes a keyboard and mouse, and inputs various forms of settings and instructions into the control section 20 in conformity to the operation of the user.

One of features of the present embodiment is that the printing control apparatus 2 (control section 20) changes the mode of setting the mode shift time by comparing the case wherein the network 5 is connected with a plurality of image forming apparatuses 1 that has been turned on, with the case wherein the network 5 is connected with one image forming apparatus 1 that has been turned on. Referring to various forms of setting examples, the following describes the procedure of setting the mode shift time by means of the control section 20 of the printing control apparatus 2.

First Setting Example

Figure 4:
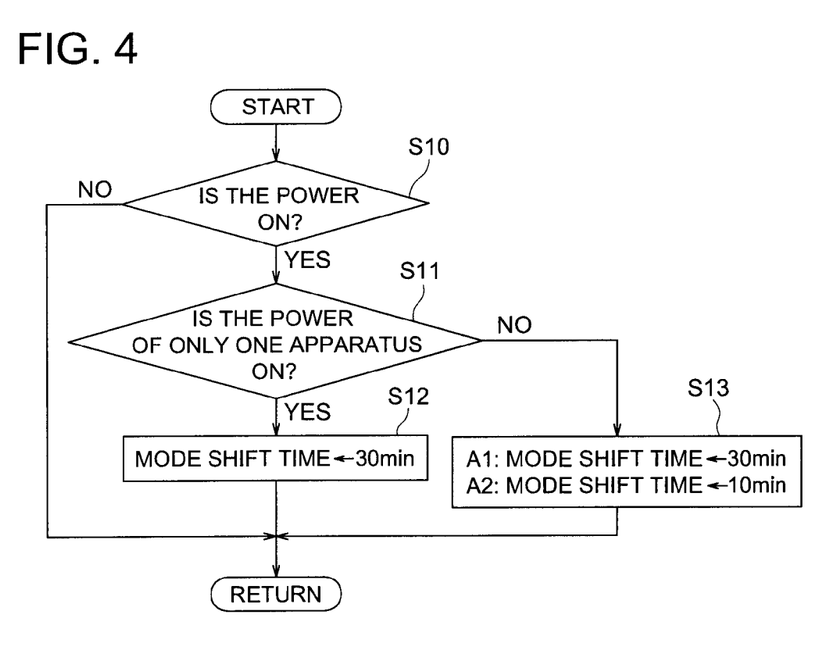
FIG. 4 is a flow chart showing an example of the mode shift time setting procedure.

FIG. 4 is a flow chart showing an example of the mode shift time setting procedure. The processing of this flow chart is called at a prescribed interval of time and is executed by the control section 20 of the printing control apparatus 2. The present setting example assumes that the network 5 is connected with two image forming apparatuses 1, and the power saving mode of each image forming apparatus 1 is in the automatic reset mode.

In Step 10 (S10), referring to the command sent from the image forming apparatus 1, the control section 20 determines whether or not there is any image forming apparatus 1 whose power (power relay) is turned on. If the decision is affirmative in Step 10, namely, if there is an image forming apparatus 1 whose power is turned on the operation proceeds to Step 11 (S11). In the meantime, if the decision is negative in Step 10, namely, if there is no image forming apparatus 1 whose power is turned on, this routine terminates.

In Step 11, the control section 20 determines if the number of the image forming apparatuses 1 that has been turned on is one or not, out of two image forming apparatuses 1. If the decision is affirmative in Step 11, namely, if there is only one image forming apparatus 1 that has been turned on, the operation proceeds to Step 12 (S12). If the second image forming apparatus 1 is also turned on, the operation goes to Step 13 (S13).

Figure 5A:
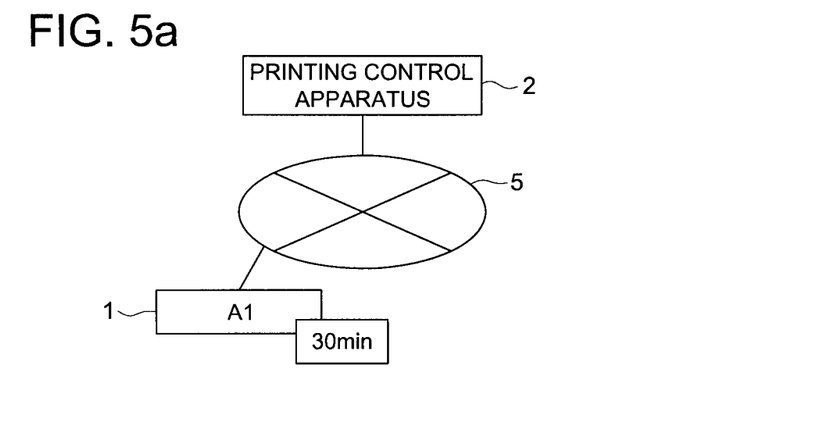
FIGS. 5a, 5b, and 5c are schematic diagrams illustrating a first setting example of the mode shift time.
Figure 5B:
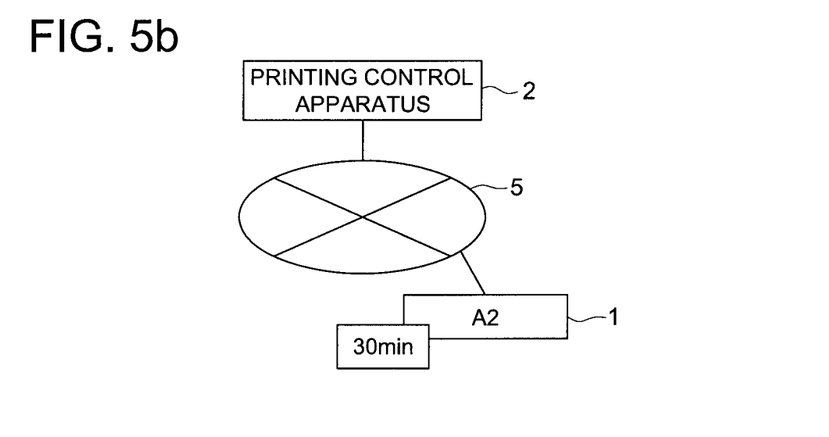

In Step 12, the control section 20 sets the mode shift time to the preset value (e.g., 30 min). As shown in FIGS. 5*a* and 5*b*, the control section 20 sends the preset mode shift time (preset value) to the image forming apparatus 1 (A1 or A2) as a command.

Figure 5C:
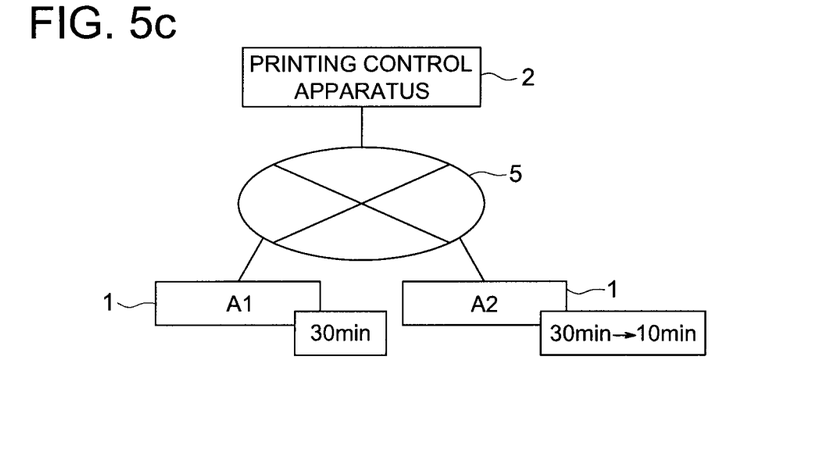

In Step 13, the control section 20 sets the mode shift time of one of two image forming apparatuses 1 to the preset value (30 min). The mode shift time of the other image forming apparatus 1 is set to a value (e.g., 10 min) smaller than the preset value. As is shown in FIG. 5*c*, the control section 20 sends the preset mode shift time (10 min, 30 min) to each of the image forming apparatuses 1 (A1, A2) as the command. For example, the mode shift time of the first image forming apparatus 1 (A1) that has been turned on is set to the preset value by the control section 20, while the mode shift time of the second image forming apparatus 1 (A2) that has been turned on is set to a value smaller than the preset value.

In such a setting example, the control section 20 holds the preset value for mode shift time in advance. If there is one image forming apparatus 1 that has been turned on, the control section 20 sets the mode shift time of the image forming apparatus 1 to the preset value. In the meantime, if a plurality of image forming apparatuses 1 are turned on, the control section 20 sets the mode shift time of one image forming apparatus 1 (A1) to the preset value (30 min), and sets the mode shift time of the other image forming apparatus 1 (A2) to a value (10 min) smaller than the preset value (30 min).

In such a structure, except for one image forming apparatus 1, the mode shift time of the remaining image forming apparatus 1 is set to a value smaller than the preset value of the other image forming apparatus 1. This allows the other image forming apparatus 1 to be shifted to the power saving mode at an earlier stage. This makes it possible to achieve power saving in terms of overall power consumption including the power consumption of each image forming apparatus 1 at an earlier stage in an environment capable of using a plurality of image forming apparatuses 1 connected to the network 5. Further, if there is only one image forming apparatus 1 wherein the preset value is set as the mode shift time, earlier shift of all the image forming apparatuses 1 to the power saving mode can be avoided, with the result that sacrificing of the user's convenience can be minimized.

In the present setting example, one and the same preset value is applied to all of the image forming apparatuses 1 (A1, A2). However, different preset values (A1=20 min, A2=30 min) can be set to each of the image forming apparatuses 1. In this case, a preset value (20 min) should be set to the mode shift time for one image forming apparatus 1 (A1), and the mode shift time of the other image forming apparatus 1 (e.g., A2) should be set to a value (10 min) smaller than the preset value (30 min). It should be noted that, for the other image forming apparatus 1 (A2), the value smaller than the preset value (30 min) is set to the mode shift time. Thus, such a value as 25 min can be used, for example. However, more effective power saving can be achieved by using a value (10 min) smaller than the preset value (20 min) that can be applied directly as the mode shift time to one image forming apparatus 1 (A1).

Second Setting Example

Figure 6:
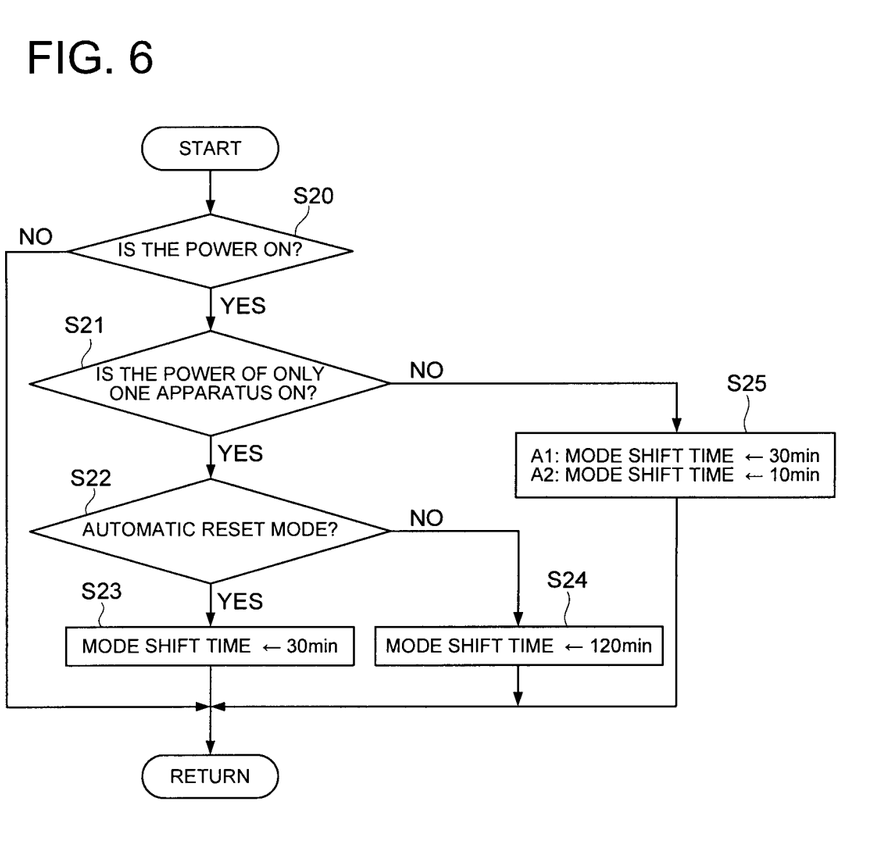
FIG. 6 is a flow chart showing an example of the mode shift time setting procedure.

FIG. 6 is a flow chart showing an example of the mode shift time setting procedure. Processing according to this flow chart is called at a prescribed interval and is executed by the control section 20 of the printing control apparatus 2. The present setting example will be described on the assumption that the network 5 is connected with two image forming apparatuses 1, and the power saving mode of one of the image forming apparatuses 1 is in the automatic reset mode, whereas the power saving mode of the other image forming apparatus 1 is in the manual reset mode.

The control section 20 detects the image forming apparatus 1 that has been turned on, to find out whether the power saving mode of the image forming apparatus 1 is in the manual reset mode or in the automatic reset mode (mode detecting section). In this case, this detection is performed by the control section 20 based on the command sent from the image forming apparatus 1.

In the first place, in Step 20 (S20), referring to the command sent from the image forming apparatus 1, the control section 20 determines if there is any image forming apparatus 1 whose power (power relay) has been turned on. If the decision in Step 20 is affirmative, namely, if the there is an image forming apparatus 1 that has been turned on, the operation proceeds to Step 21 (S21). If the decision in Step 20 is negative, namely, if the there is no image forming apparatus 1 that has been turned on, this routine terminates.

In Step 21, the control section 20 determines whether or not one of the two image forming apparatuses 1 has been turned on. If the decision in Step 21 is affirmative, namely, if there is only one image forming apparatus 1 that has been turned on, the operation proceeds to Step 22 (S22). If the second image forming apparatus 1 is also turned on, the operation goes to Step 25 (S25).

In Step 22, the control section 20 determines whether or not the power saving mode of the image forming apparatus 1 that has been turned on is in the automatic reset mode. If the decision in Step 22 is affirmative, namely, if the power saving mode is in the automatic reset mode, the operation goes to Step 23 (S23). If the decision in Step 22 is negative, namely, if the power saving mode is in the manual reset mode, the operation goes to Step 24 (S24).

Figure 7A:
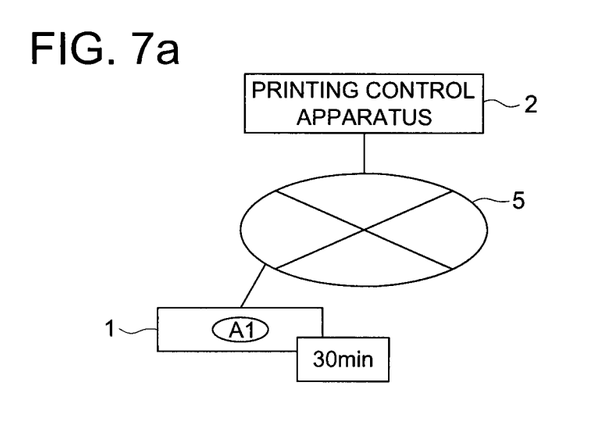
FIGS. 7a, 7b, and 7c are schematic diagrams illustrating a second setting example of the mode shift time.

In Step 23, the control section 20 sets the preset value (e.g., 30 min) corresponding to the automatic reset mode as the mode shift time of the image forming apparatus 1 that has been turned on. As shown in FIG. 7a, the control section 20 sends the set mode shift time as a command to the image forming apparatus 1 (A1) that has been turned on.

Figure 7B:
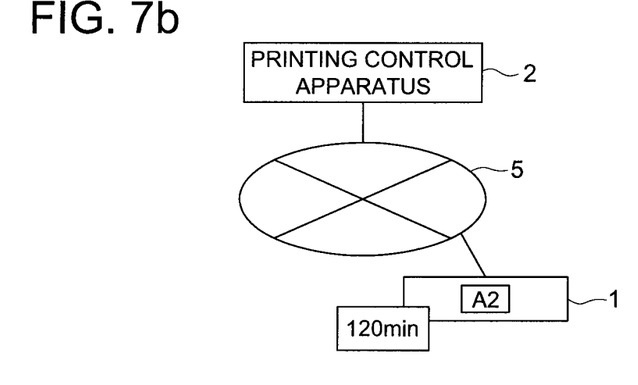

In Step 24, the control section 20 sets the preset value (e.g., 120 min) corresponding to the manual reset mode as the mode shift time of the image forming apparatus 1 that has been turned on. As shown in FIG. 7b, the control section 20 sends the set mode shift time as a command to the image forming apparatus 1 (A2) that has been turned on.

Figure 7C:
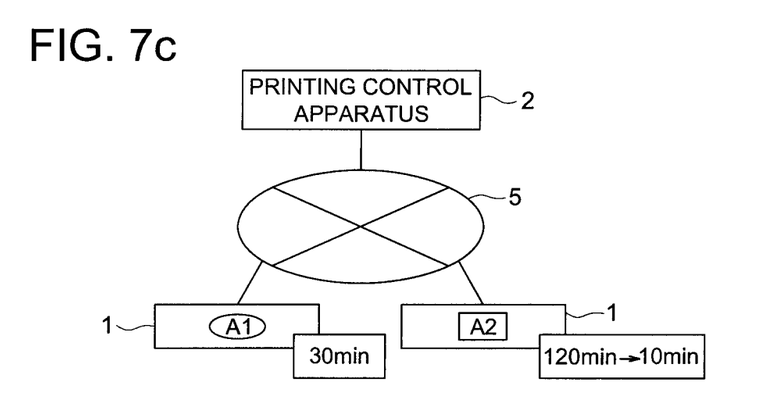

In Step 25, the mode shift time of the image forming apparatus 1 corresponding to the automatic reset mode out of the two image forming apparatuses 1 is set to the preset value (30 min) corresponding to the automatic reset mode by the control section 20. Further, the mode shift time of the image forming apparatus 1 corresponding to the manual reset mode out of the two image forming apparatuses 1 is set to the value (e.g., 10 min) smaller than the preset value (120 min) corresponding to the manual reset mode by the control section 20. As shown in FIG. 7c, the control section 20 sends the set mode shift time as a command to the image forming apparatus 1 (A1) corresponding to the automatic reset mode, and sends the same as a command to the image forming apparatus 1 (A2) corresponding to the manual reset mode.

As described above, according to the present setting example, the preset value corresponding to the automatic reset mode and the preset value corresponding to the manual reset mode set to a value greater than the preset value are held by the control section 20 as the preset values of the mode shift time. Thus, the preset value is applied in conformity to the power saving mode of the image forming apparatus 1.

Although the manual reset mode is superior in terms of power saving, resetting to the normal power mode is considered to be complicated. In the meantime, the automatic reset mode is considered to be inferior in terms of power saving although resetting to the normal power mode is simple. By contrast, in the present setting example, the mode shift time to be set on the image forming apparatus 1 can be set to the optimum value in conformity to the type of power saving mode, with consideration given to the features of each power saving mode. This ensures balanced compatibility between convenience and power saving.

According to the present setting example, the control section 20 sets the preset value (30 min) corresponding to the automatic reset mode as the mode shift time on the image forming apparatus 1 (A1) in the automatic reset mode, out of a plurality of image forming apparatuses 1 that has been turned on, and the value (10 min) smaller than the preset value (120 min) corresponding to the manual reset mode as the mode shift time on the image forming apparatus 1 in the manual reset mode.

According to such a setting example, the image forming apparatus 1 (A2) in the manual reset mode having a greater contribution to power saving can be shifted to the power saving mode at an earlier stage by comparison with the image forming apparatus 1 (A1) in the automatic reset mode as the mode shift time. This makes it possible to achieve power saving in terms of overall power consumption including the power consumption of each image forming apparatus 1 at an earlier stage in an environment capable of using a plurality of image forming apparatuses 1 connected to the network 5. Further, when the image forming apparatus 1 wherein the preset value is set as the mode shift time is used as the image forming apparatus 1 (A1) in the automatic reset mode, power saving can be achieved without sacrificing the convenience of the user.

In this setting example, 10 min is used as a value smaller than the preset value (120 min) corresponding to the manual reset mode, without the present invention restricted thereto. To be more specific, it is only required to use a value smaller than the preset value corresponding to the automatic reset mode. Sufficient power saving can be achieved without having to set a value of 60 min. However, more effective power saving can be achieved by using a value (10 min) smaller than the mode shift time corresponding to the automatic reset mode wherein the preset value (20 min) can be applied directly.

Third Setting Example

Figure 8:
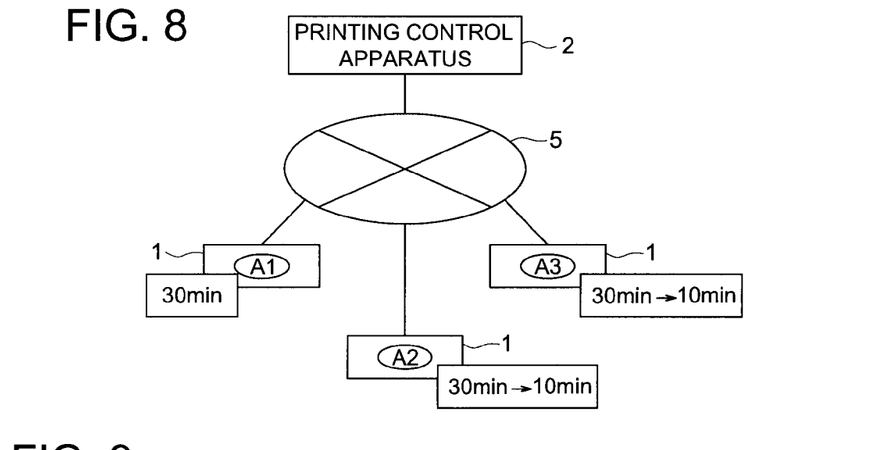
FIG. 8 is a schematic diagram illustrating a third setting example of the mode shift time.

FIG. 8 is a schematic diagram illustrating a third setting example of the mode shift time. In this setting example, a plurality of image forming apparatuses 1, namely, three image forming apparatuses 1 are connected to the network 5. In each of the image forming apparatus 1, the automatic reset mode is set in the power saving mode. In this case, the control section 20 of the printing control apparatus 2 sets the mode shift time of one image forming apparatus 1 (A1) to the preset value (e.g., 30 min) corresponding to the automatic reset mode, and sets the mode shift time of the other image forming apparatuses 1 (A2, A3) to a value (e.g., 10 min) smaller than the preset value.

Figure 9:
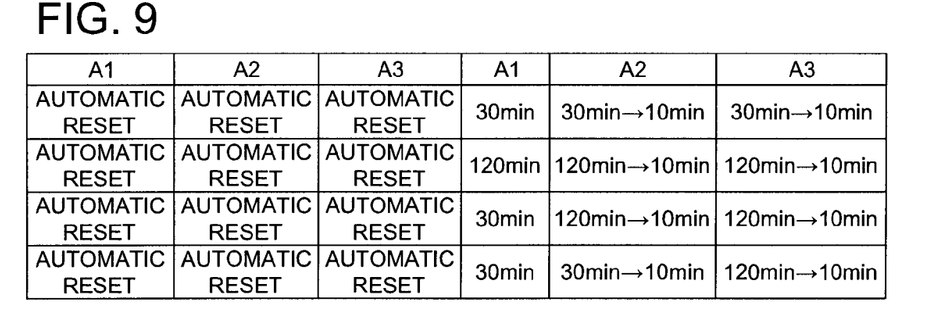
FIG. 9 is an explanatory diagram illustrating a mode shift time setting example in terms of differences in power saving mode.

Further, in the above description, the power saving mode of the image forming apparatus 1 connected to the network 5 is in the automatic reset mode. However, the power saving mode of the image forming apparatus 1 can be in the manual reset mode. In this case, the control section 20 of the printing control apparatus 2 sets the mode shift time of a desired image forming apparatus 1 (A1) to the normal preset value (e.g., 120 min) corresponding to the manual rest mode, and the mode shift time of the other image forming apparatuses 1 (A2, A3) to the value (e.g., 10 min) smaller than the normal preset value, as shown in FIG. 9

In such a structure, except for one image forming apparatus 1, the mode shift time of the remaining image forming apparatuses 1 is set to a value smaller than the preset value. This allows the remaining image forming apparatuses 1 to be shifted to the power saving mode at an earlier stage. This makes it possible to achieve power saving in terms of overall power consumption including the power consumption of each image forming apparatus 1 at an earlier stage in an environment capable of using a plurality of image forming apparatuses 1 connected to the network 5. Further, if there is only one image forming apparatus 1 wherein the preset value is set as the mode shift time, power saving can be achieved without sacrificing the convenience of the user.

When the power saving mode of one of three image forming apparatuses 1 connected to the network 5 is in the automatic reset mode and the power saving mode of the remaining image forming apparatuses 1 is in the manual reset mode, the mode shift time is set as follows: The control section 20 of the printing control apparatus 2 sets the mode shift time of the image forming apparatus 1 corresponding to the automatic reset mode to the preset value (30 min) corresponding to the automatic reset mode, whereas the control section 20 sets the mode shift time of the image forming apparatus 1 corresponding to the manual reset mode to a value (e.g., 10 min) smaller than the preset value (120 min) corresponding to the manual reset mode.

If the power saving mode of one of the three image forming apparatuses 1 connected to the network 5 is in the manual reset mode, and the power saving mode of the remaining two image forming apparatuses 1 is in the automatic reset mode, the mode shift time is set as follows: The control section 20 of the printing control apparatus 2 sets the mode shift time of one image forming apparatus 1 corresponding to the automatic reset mode to the preset value (30 min) corresponding to the automatic reset mode. Further, the control section 20 sets the mode shift time of the remaining image forming apparatuses 1 corresponding to the automatic reset mode to the value (10 min) smaller than the preset value (30 min) corresponding to the automatic reset mode, whereas the control section 20 sets the mode shift time of the image forming apparatus 1 corresponding to the manual reset mode to a value (e.g., 10 min) smaller than the preset value (120 min) corresponding to the manual reset mode.

According to such a setting example, the image forming apparatus 1 (A2) in the manual reset mode having a greater contribution to power saving can be shifted to the power saving mode at an earlier stage by comparison with the image forming apparatus 1 (A1) in the automatic reset mode as the mode shift time. This makes it possible to achieve power saving in terms of overall power consumption including the power consumption of each image forming apparatus 1 at an earlier stage in an environment capable of using a plurality of image forming apparatuses 1 connected to the network 5. Further, when the image forming apparatus 1 wherein the preset value is set as the mode shift time is used as the image forming apparatus 1 (A1) in the automatic reset mode, power saving can be achieved without sacrificing the convenience of the user.

Fourth Setting Example

Figure 10:
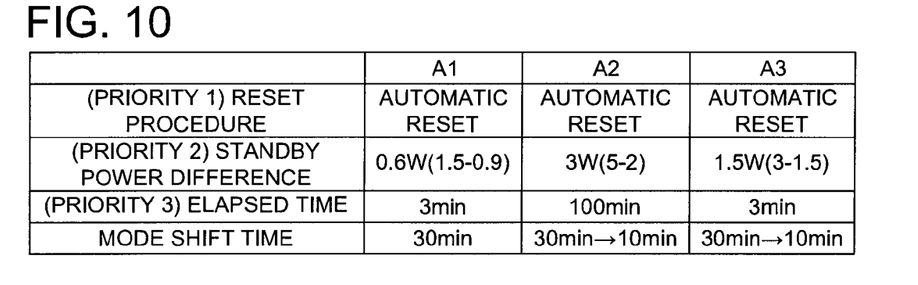
FIG. 10 is an explanatory diagram illustrating the image forming apparatus 1 evaluation items and mode shift time setting example.

FIG. 10 is an explanatory diagram illustrating the mode shift time setting procedure using the order of priority. In the aforementioned third setting example, a prescribed mode shift time for a prescribed apparatus is set on each of the image forming apparatuses 1. In the present setting example, the mode shift time for each apparatus is set as considered from various aspects.

To put it more specifically, the control section 20 of the printing control apparatus 1 assesses each image forming apparatus 1 for each item with the order of priority having been preset. In response to this assessment, the mode shift time for each image forming apparatus 1 is set.

In the first place, the control section 20 compares the procedures for resetting from the power saving mode, as the first item. To be more specific, the control section 20 checks each image forming apparatus 1 to see if the power saving mode is in the automatic reset mode or in the manual reset mode. If the power saving mode of all image forming apparatuses 1 is in the automatic reset mode, the operation goes to the next item.

The control section 20 compares the difference in standby power in the second item. The difference in standby power in the sense in which it is used here refers to the difference between the power consumption of the image forming apparatus 1 in the normal power mode, and the power consumption of the image forming apparatus 1 in the power saving mode. The control section 20 sets the mode shift time to a smaller value since the apparatus having a greater difference in standby power makes a greater contribution to power saving. To put it more specifically, the control section 20 sets the mode shift time of the image forming apparatus 1 having the smallest difference in standby power to the preset value (e.g., 30 min) corresponding to the automatic reset mode. The mode shift time of the remaining image forming apparatuses 1 having a greater difference in standby power is set to a value (e.g., 10 min) smaller than the preset value (e.g., 30 min).

Figure 11:
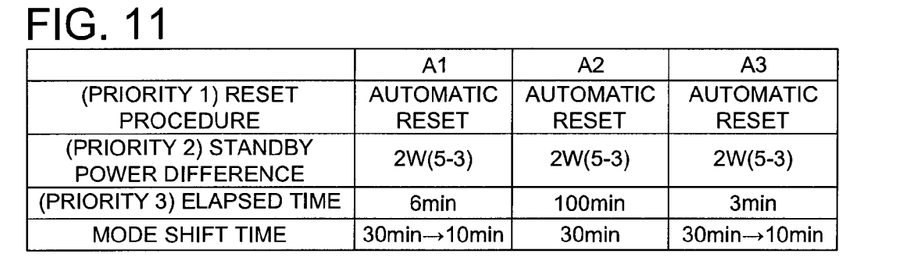
FIG. 11 is an explanatory diagram illustrating the image forming apparatus 1 evaluation items and mode shift time setting example.

If the differences in standby power are on the same level among image forming apparatuses 1, the control section 20 compares the times elapsed after the final printing job in the third item, as shown in FIG. 11. To put it more specifically, control section 20 sets the mode shift time of the image forming apparatus 1 wherein the elapsed time is greater, to the preset value (e.g., 30 min) corresponding to the automatic reset mode. The mode shift time of the remaining image forming apparatuses 1 where the elapsed time is smaller is set to a value (e.g., 10 min) smaller than the preset value (e.g., 30 min).

According to the present setting example as described above, a plurality of image forming apparatuses 1 are assessed according to a plurality of items whose order of priority has been determined. Based on this evaluation result, the next step is taken to determine the image forming apparatus 1 wherein the preset value is directly set as the mode shift time. This structure permits selection of an image forming apparatus 1 making a greater contribution to power saving that can be shifted to the power saving mode at an earlier stage. This makes it possible to achieve power saving in terms of overall power consumption including the power consumption of each image forming apparatus 1 at an earlier stage in an environment capable of using a plurality of image forming apparatuses 1 connected to the network 5.

Fifth Setting Example

Figure 12:
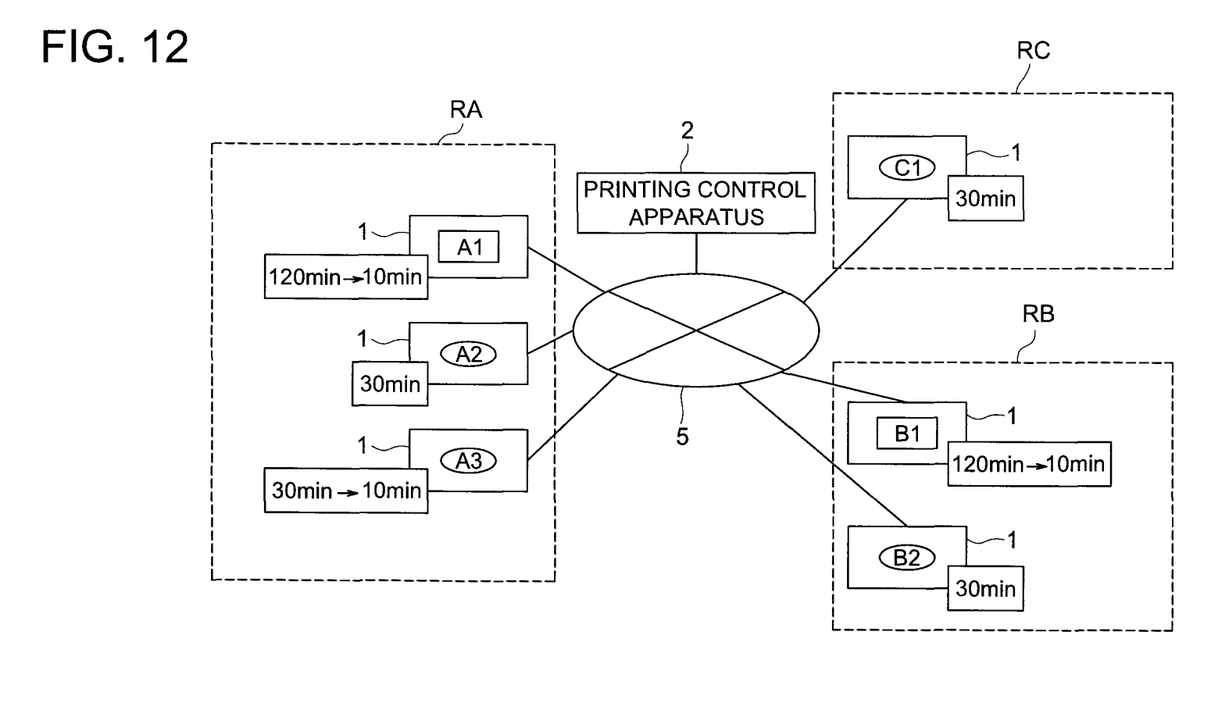
FIG. 12 is a schematic diagram illustrating a fifth setting example of the mode shift time.

FIG. 12 is a schematic diagram illustrating a fifth setting example of the mode shift time. In the present setting example, the image forming apparatuses 1 are distributed across a plurality of regions RA, RB and RC, and are grouped into each region. The first region RA includes one image forming apparatus 1 (A1) corresponding to the manual reset mode and two image forming apparatuses 1 (A2, A3) corresponding to the automatic reset mode. Further, the second region RB includes one image forming apparatus 1 (B1) corresponding to the manual reset mode and one image forming apparatus 1 (B2) corresponding to the automatic reset mode. The third region RC has one image forming apparatus 1 (C1) corresponding to the automatic reset mode.

In this case, the control section 20 receives the region information on each image forming apparatus 1 as a command from each image forming apparatus 1. Alternatively, the control section 20 stores in advance the information on which of the image forming apparatuses 1 is associated with which of the regions RA through RC. For each of the regions RA through RC, the control section 20 sets the mode shift time on one or more image forming apparatuses 1 contained in the group.

This configuration allows a plurality of image forming apparatuses 1 connected to the network 5 to be divided and managed for each region. Thus, this configuration ensures power saving to be achieved for each group in terms of the overall power consumption including the power consumption of each image forming apparatus 1.

The printing system as embodiments of the present invention has been described. It is to be expressly understood, however, that the present invention is not restricted thereto. It goes without saying that the present invention can be embodied in a great number of variations without departing from the scope of the invention claimed. Further, the printing control apparatus constituting the aforementioned printing system works as part of the present invention.

The aforementioned embodiment is provided with a printing control apparatus. However, the printing control apparatus can be omitted if the image forming apparatus connected to the network performs the function of the printing control apparatus. In this case, the image forming apparatus is provided with a function as an image forming section for forming an image on a sheet of paper and a function as a print control section for performing the function of the printing control apparatus. The image forming apparatus sets the mode shift time on other image forming apparatuses connected to the network and one or more image forming apparatuses including the image forming apparatus itself.

According to the present embodiment, the setting mode of the mode shift time is changed by the setting means through comparison between the network connected with a plurality of image forming apparatuses that has been turned on, and the network connected with only one image forming apparatus that has been turned on. This arrangement enables the mode shift time to be set, with consideration given to the overall power management of the image forming apparatuses that have been turned on. Thus, this arrangement ensures power saving to be achieved in terms of the overall power consumption including the power consumption of each image forming apparatus 1.

What is claimed is:

1. A printing control apparatus which is connected communicatably via a network with a plurality of image forming apparatuses, the printing control apparatus comprising:
a power source detection section which detects an image forming apparatus which has been turned on, among a plurality of image forming apparatuses connected with the network; and
a setting section which, based on a result of the detection by the power source detection section, sets a mode shift time for shifting a power consumption mode for each of image forming apparatuses which have been turned on, from a normal power mode to a power saving mode a power consumption of which is less than a power consumption of the normal power mode, when the mode shift time has passed after a completion of a last image formation job of the each of image forming apparatuses, wherein the power saving mode is a power consumption mode in which power is on; and
a notice section which notices the set mode shift time to the image forming apparatus corresponding to the mode shift time,
wherein the setting section changes the mode shift time from the normal power mode to the power saving mode in a case when a plurality of image forming apparatuses which have been turned on are connected with the network, by comparing with a case when only one image forming apparatus which has been turned on is connected with the network.

2. The printing control apparatus described in claim 1, wherein the setting section holds a preset value for the mode shift time in advance, in the case when only one image forming apparatus which has been turned on is connected with the network, the setting section sets the mode shift time of the only one image forming apparatus with the preset value, and, in the case when a plurality of image forming apparatuses which have been turned on are connected with the network, the setting section sets the mode shift time of one image forming apparatus with the preset value and sets the mode shift time of rest image forming apparatuses with a value smaller than the preset value.

3. The printing control apparatus described in claim 1, further comprising a mode detection section which detects, for an image forming apparatus which is turned on, whether a power saving mode of the image forming apparatus is a power saving mode of a manual recovering type which requires a manual operation by a user or a power saving mode of an automatic recovering type in which the power saving mode is self-recoverable to the normal power mode, when the power saving mode of the image forming apparatus recovers from the power saving mode to the normal operation mode, wherein the setting section holds a preset value corresponding to the automatic recovering type and a preset value corresponding to the manual recovering type which is set with a larger value than the preset value corresponding to the automatic recovering type and applies the preset value corresponding to a type of the power saving mode of the image forming apparatus.

4. The printing control apparatus described in claim 3, wherein, when a plurality of image forming apparatuses which have been turned on are connected with the network and all of the plurality of image forming apparatus are of the power saving mode of the automatic recovering type, the setting section sets the mode shift time of one image forming apparatus among the plurality of the image forming apparatus with the preset value corresponding to the automatic recovering type, and sets the mode shift times of rest image forming apparatuses of the plurality of the image forming apparatuses with a value shorter than the predetermined value corresponding to the automatic recovering type.

5. The printing control apparatus described in claim 3, wherein, when a plurality of image forming apparatuses which have been turned on are connected with the network and all of the plurality of the image forming apparatus are of the power saving mode of the manual recovering type, the setting section sets the mode shift time of one image forming apparatus of the plurality of the image forming apparatus with the preset value corresponding to the manual recovering type, and sets the mode shift times of rest image forming apparatuses of the plurality of the image forming apparatuses with a value shorter than the predetermined value corresponding to the manual recovering type.

6. The printing control apparatus described in claim 3, wherein, when a plurality of image forming apparatuses which have been turned on and include an image forming apparatus of the power saving mode of the automatic recovering type and an image forming apparatus of the power saving mode of the manual recovering type, are connected with the network, the setting section sets the mode shift time of the image forming apparatus of the power saving mode of the automatic recovering type among the plurality of image forming apparatuses with the preset value corresponding to the automatic recovering type, and sets the mode shift time of the image forming apparatus of the power saving mode of the manual recovering type among the plurality of image forming apparatuses with a shorter value than the preset value corresponding to the manual recovering type.

7. The printing control apparatus described in claim 6, wherein, when a plurality of image forming apparatuses which are of the power saving mode of the automatic recovering type are connected with the network, the setting section sets the mode shift time of one of the plurality of the image forming apparatuses with the preset value corresponding to the automatic recovering type and sets the mode shift times of rest of the plurality of the image forming apparatuses with a value shorter than the preset value corresponding to the automatic recovering type.

8. The printing control apparatus described in claim 3, wherein, when a plurality of image forming apparatuses which have been turned on are connected with the network, the setting section assesses each of the plurality of image forming apparatuses according to a plurality of items each of which has been preset with an order of priority and, based on a result of the assessment, the setting section determines an image forming apparatus the mode shift time of which is to be set with a preset value as it is.

9. The printing control apparatus described in claim 8, wherein the setting section is provided with a plurality of items which is preset with a priority order lowering by the following order: a type of power saving modes, a difference of power consumption between the normal power mode and the power saving mode, and a passing time from a last printing job.

10. The printing control apparatus described in claim 1, wherein the plurality of image forming apparatus are grouped by each region of a plurality of regions where the image forming apparatuses are distributed, and the setting section performs a setting processing of the mode shift time for each of the groups in which one or more of image forming apparatuses are included.

11. An image forming apparatus comprising:
an image forming section which forms image on a sheet; and
a print control section which is connected communicatably via a network with one or more of image forming apparatuses, the print control section comprising:
a power source detection section which detects an image forming apparatus which has been turned on, out of the one or more of image forming apparatuses connected with the network;
a setting section which, based on a result of the detection by the power source detection section, sets a mode shift time which represents a determining condition for each of image forming apparatuses which have been turned on, the determining condition by which the image forming apparatus shifts from a normal power mode to a power saving power mode a power consumption of which is less than a power consumption of the normal power mode, wherein the power saving mode is a power consumption mode in which power is on;
a setting section which, based on a result of the detection by the power source detection section, sets a mode shift time for shifting a power consumption mode for each of image forming apparatuses which have been turned on, from a normal power mode to a power saving mode a power consumption of which is less than a power consumption of the normal power mode, when the mode shift time has passed after a completion of a last image formation job of the each of image forming apparatuses; and
a notice section which notices the set mode shift time to the image forming apparatus corresponding to the mode shift time,
wherein the setting section changes the mode shift time from the normal power mode to the power saving mode in a case when a plurality of image forming apparatuses which have been turned on are connected with the network, by comparing with a case when only one image forming apparatus which has been turned on is connected with the network.

12. The image forming apparatus described in claim 11, wherein the setting section sets the mode shift time for one or more of image forming apparatuses including the image forming apparatus and another image processing apparatus which is connected via the network.

13. A printing system comprising:
a plurality of image forming apparatus which are connected with a network, and
a print control apparatus which is connected communicatably via a network with a plurality of image forming apparatuses, the printing control apparatus comprising:

a power source detection section which detects an image forming apparatus which has been turned on, among a plurality of image forming apparatuses connected with the network; and a setting section which, based on a result of the detection by the power source detection section, sets a mode shift time for shifting a power consumption mode for each of image forming apparatuses which have been turned on, from a normal power mode to a power saving mode a power consumption of which is less than a power consumption of the normal power mode, when the mode shift time has passed after a completion of a last image formation job of the each of image forming apparatuses, wherein the power saving mode is a power consumption mode in which power is on; and a notice section which notices the set mode shift time to the image forming apparatus corresponding to the mode shift time, wherein the setting section changes the mode shift time from the normal power mode to the power saving mode in a case when a plurality of image forming apparatuses which have been turned on are connected with the network, by comparing with a case when only one image forming apparatus which has been turned on is connected with the network.

* * * * *